Dec. 3, 1929.  J. A. PROCTOR ET AL  1,738,314
ELECTRICAL CONDENSER
Original Filed Jan. 23, 1925
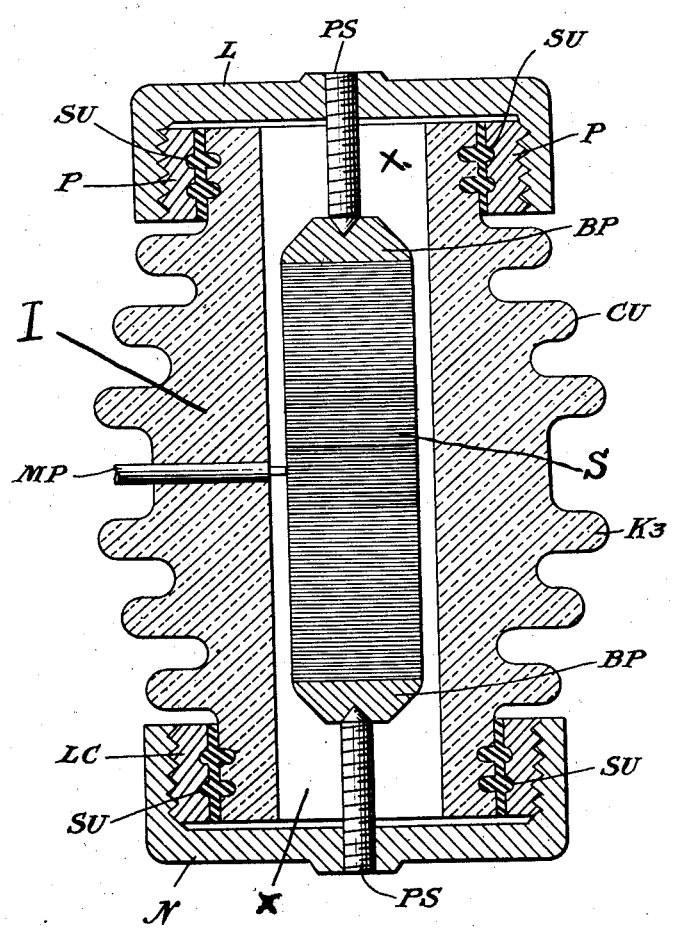
INVENTORS
John A. Proctor
William M. Bailey
BY
ATTORNEY Patented Dec. 3, 1929

1,738,314

UNITED STATES PATENT OFFICE

JOHN A. PROCTOR, OF LEXINGTON, AND WILLIAM M. BAILEY, OF LYNN, MASSACHUSETTS, ASSIGNORS TO WIRELESS SPECIALTY APPARATUS COMPANY, OF BOSTON, MASSACHUSETTS, A CORPORATION OF NEW YORK

ELECTRICAL CONDENSER

Original application filed January 23, 1925, Serial No. 4,150. Divided and this application filed June 14, 1926. Serial No. 115,716.

This application is a division of our application, Serial No. 4150, filed January 23, 1925.

This invention relates to improvements in electrical condensers, particularly in high potential condensers, and more particularly of the sheet-stack type, especially wherein the stack or high potential service comprises a plurality of sections insulated from one another by insulating sheets between the sections in the stack and connected in series with one another by connections outside the stack.

Among the various objects of the invention is that of providing a structure which is an improvement on the special type wherein the stack is contained in a substantially or more or less tubular casing which consists of insulating material preferably such as porcelain and which is provided with metal ends which serve to clamp the stack under high compression inside the casing, to complete the enclosure of the stack and to serve as electrical terminals at high potential difference which lie at opposite ends of the structure separated from one another by the insulating walls of such casing.

The drawing is a central vertical section of an embodiment of the invention.

In the drawing the series-connected sections (shown diagrammatically) of stack S are insulated from one another by wide mica sheets as usual, each section consisting of alternating mica sheets and foil sheets. This results in a high potential difference across the end sections of the stack when, as usual, the foils projecting from opposite ends of each section are soldered or fused to the like foils of adjacent sections.

In this invention, the casing for stack S consists of a tube I of porcelain, such material being that heretofore extensively employed in high potential insulators, but here serving as the casing for stack S. The open ends of this porcelain casing are closed by metal end structures.

Stack S may be embedded in wax inside the tubular casing. Casing I may be formed with corrugations K3 to increase the flashover characteristic between the condenser terminals. A high potential lead MP is brought out through a hole in casing I from a midpoint of the stack S, so that the ends of the stack are at low and the same potential. Top and bottom metal collars P and LC, and also insulating casing I, are formed with registering holes filled with cement SU anchoring the collars to the casing. Metal end caps or covers L and N close the ends of casing I, are provided with flanges as shown by which they are secured by any suitable means to the insulating casing I as by threaded engagement with collars P and LC respectively as shown, and said caps or covers receive pressure screws PS operating on bearing plates BP at the two ends of the stack. Thus end caps or covers L and N constitute both the sealing means for the stack and also the means for transmitting the compression strains to casing I as the tension member of the stack-clamping system as via collars P and LC. Here the exterior glazed (vitreous) surface of casing I, corrugated at CU, serves to insulate, with a high flashover, the high potential terminal MP from the metal end structures.

The bottom end member N preferably is of malleable iron, and is one of the compression members of the clamping system for stack S. The outside wall of the lower end of casing I is (at TC) slightly tapered outwardly and downwardly and is corrugated, or substantially roughened or grooved, as shown. The inner wall of collar LC is correspondingly cooperatively tapered, i. e., inwardly and upwardly, that is, opposite to the casing-taper. It also is roughened or corrugated or grooved as shown. The cement SU is placed in the annular space between the tapered walls of collar LC and casing I. The tapered and corrugated portion of the porcelain casing is unglazed so as to take the cement most effectively. With this construction, the only way thereafter to separate casing I and end N is to crush or dig out the cement SU. End N closes and seals the lower end of casing I. For SU, we recommend neat Portland cement.

On top and bottom of stack S are placed metal bearing plates BP. Stack S may be embedded in paraffin wax or submerged in oil; but owing to the insulation provided by glazed porcelain casing I between the metal ends of the stack and midpoint MP, the only function required of the wax or oil, if used, is to prevent flashover from stack section to stack section. Stack S may lie as close as desired to the interior wall of casing I, so that a compact over-all structure is permitted. The exterior wall of casing I is glazed, save at the tapered cemented portions. The inside wall of casing I is unglazed to permit intimate contact by wax or oil, if used to seal along the inside wall against moisture and prevent leakage path between terminals.

The metal top construction, as shown, is similar to the above-described bottom construction. A malleable iron collar L is applied to casing I as by the means shown and described above for end member N. The ends of casing I and of the metal end members L, N should be parallel to one another. Casing I preferably is provided with the corrugations, skirts or petticoats K3 which increase the leakage distance of high potential flashover from one metal end L or N to mid-point MP over the glazed porcelain exterior of casing I. The glaze seals the porcelain pores (not present when casing I is of the type of glass such as baking dishes, etc. are made of as permissible) and assists in shedding water and dirt. The skirts, in addition to increasing the flashover distance, also assist in shedding water and dirt and provide surfaces beneath them which are protected from access of moisture and dirt; and they serve to increase the mechanical strength of the porcelain casing, in this sense constituting a thick casing wall with or without substantial thickness of the rest of the casing wall. This condenser unit is a weatherproof and waterproof high potential condenser which is designed for outdoor service with adjacent high tension lines. It is an important feature of the corrugations in the form of skirts K3 that, as distinguished from the location of ordinary condenser casings under an insulating canopy, the spaces beneath and inside the skirts of condenser casing I do not permit of birds nesting.

Between the top of stack S and the upper end of casing I, and between the bottom of stack S and the lower end of casing I, are spaces X which provide tolerance for stacks S of varying length and substantially the same capacitance; pressure screws PS being sufficiently long for this purpose. The bottom of stack S may rest directly on bottom N. The two metal end structures need not be duplicates as shown.

Before the application of the cover-plate L, the pressure-plate BP is applied. This plate BP (with screws PS) clamps stack S under high compression of the order of a thousand pounds more or less per square inch of active area of the stack. Screw PS is carried by end L when the latter is screwed on collar P, screw PS entering the centering hole shown in pressure bearing plate BP. Then screw PS is turned further down thru end L, putting stack S under the desired pressure, and finally screw PS is sawn off, as shown, flush with the top of top end L. Said further adjustment of screw PS pushes end L upwardly, the strain coming on the two threads of end L and collar P. Since collar L and lower end N are rigid with casing I, the latter thereby becomes the tension member of the stack-clamping system.

Casing I, while preferably of porcelain (i. e., vitreous at least on its surfaces, as the outer surface) may be in some cases of other insulating material such as glass of the aforementioned type and the like, having at least a surface which is vitreous. Porcelain, however, is preferred for the weather-proof form, and porcelain is better for this type of condenser generally on account of its strength which is availed of in special ways by this invention, the structural weakness of the porcelain in other respects being sufficiently discounted by adequate thickness of the casing walls as shown in proportion, and the proper structure for cementing of metal end structures as above. In practice, this condenser unit has dimensions which over-all and in detail are larger by several times than the dimensions of the drawing. The outer surface of porcelain casing I may be corrugated in other ways than the skirting K3.

This structure provides a strong clamping-casing of insulating material, notwithstanding the fact that the material itself is structurally weak. In this structure there are no metal parts save the stack-armatures (foils), the end structures and mid-terminal MP. There is ample leakage or flashover path over an ideal insulator (I) between the parts of high potential difference. Mid-terminal MP may be omitted and the end structures constitute the terminals of high potential difference. By virtue of the special construction disclosed herein, the strength of the porcelain is utilized and its structural weakness is minimized. The metal ends perform four functions, (1) compress the stack; (2) serve as condenser terminals; (3) when mid-terminal MP is omitted they serve as localizers of electrostatic fields at the opposite potential ends of the stack; and (4) they serve as means by which successive condenser units may be mounted together end to end, the ends L and N being permissively adapted in structure for that purpose in any desired convenient form. On account of the insulation provided by porcelain casing I, the problem is entirely eliminated which has been involved in series sectional high potential condensers in connection with the insulation of a high potential terminal from a metal stack-casing out through which such terminal extends from the stack.

The condenser unit herein described is designed for low current service (at high potential) and therefore there is provided no special means for heat-dissipation other than the metal end structures and the insulating filler as wax or oil when used. In other and higher current uses of the invention, however, such special heat-dissipating means may be incorporated as desired by the designer.

The condenser units hereof are designed particularly for outdoor use in arrangements of plural units, as high potential, low-current condensers for coupling carrier-wave transmitting apparatus to a high potential transmission line. Assume a three-wire power line (for direct current with neutral wire or for three-phase alternating current) which is employed also to convey lower power carrier currents at radio frequency, transmitted, say, from a radio transmitting transformer and received at a distant radio receiving transformer; these carrier currents being used on one side of the power line, with earth connections therefrom via the radio apparatus. The line may carry power currents of the order of tens of kilovolts. The potential across each of a plurality of condenser units may be over twenty thousand volts. The function of the apparatus shown is to provide a good path for the radio frequency carrier currents but at the same time a poor path for the higher voltage line current, keeping the latter from access to and thereby injuring the radio apparatus including the transformer coils.

In the claims the specification of the casing as porcelain is intended to appropriate all patentable novelty as to such specific material itself in addition to other materials of functional equivalency in the several combinations of the various claims. Casing I preferably is vitreous at least as to its exterior surface and when of glass of course is entirely vitreous.

We particularly point out and distinctly claim the part, improvement or combination which we claim as our invention or discovery, as follows:—

1. The combination with an electrical condenser stack, of a porcelain casing therefor having opposite end openings; a metal clamping terminal closing one end of the casing; a metal collar secured to the outside of the casing at its other end; and a metal cover closing the said other end of the casing, secured to said collar, and transmitting stack compression strains to the casing as a tension member.

2. The combination with an electrical condenser stack and a porcelain casing therefor having an end opening; an exteriorly threaded metal collar extending around the outside lateral wall of the casing adjacent the end opening thereof; a metal cover closing said casing opening and interiorly threaded, thereby engaging said collar; and a clamping device extending between the stack and said cover, compressing the stack and transmitting stack-clamping strains to the casing by way of the cover and collar.

3. The combination with an electrical condenser stack, of a porcelain casing therefor having an end opening; a metal collar extending around the outside wall of the casing adjacent the end opening thereof; a metal cover closing said casing opening and secured by screw-threads to said collar; and a clamping device extending between the stack and said cover, compressing the stack and transmitting stack-clamping strains to the casing by way of the cover and collar.

4. The combination with an electrical condenser stack, of a porcelain casing therefor formed with an end opening; a metal end member adjacent the end of the casing wall around the casing opening, and formed with an integral flange extending along but outside of the casing wall near the end opening of the casing; a stack-compressing device located inside the casing between the stack and said end member and arranged to tend to force said end member away from said end of the casing wall; a metal collar located between said flange and the adjacent portion of the casing wall and secured to the flange; and cement binding said collar to the casing wall.

5. The combination with a series sectional condenser stack, of a porcelain casing therefor having two opposite end openings and a lead-opening intermediate said end openings; metal end members secured to the casing and constituting parts of a mechanical system clamping the stack and comprising a clamping device located inside the casing between the stack and one of the end-members; and a lead from the mid-point of the series-sectional stack and extending out thru said intermediate casing member.

6. The combination with a stack of electrical condenser sheets, of a porcelain casing therefor having opposite end openings; a metal clamping terminal closing one end of the casing; a metal collar at the other end of the casing; and a metal cover closing the said other end of the casing, secured to said collar, and transmitting stack-compression strains to the casing as a tension member.

In testimony whereof we hereunto affix our signatures.

JOHN A. PROCTOR.
WILLIAM M. BAILEY.